3,034,849
NON-DUSTING STABILIZED DIAZO
SALT COMPOSITIONS
Gustav Edward Rast, Hamburg, N.Y., assignor to Allied Chemical Corporation, New York, N.Y., a corporation of New York
No Drawing. Filed Apr. 23, 1959, Ser. No. 808,296
12 Claims. (Cl. 8—79)

This invention relates to non-dusting stabilized diazo salt compositions and to an improved process for the production thereof. More particularly, it concerns the incorporation of a non-ionic surface-active agent in a powdered, dry stabilized diazo salt to obtain a stable non-dusting, free flowing composition.

In the preparation of stabilized diazonium salts, i.e. the known Fast Color Salts of commerce, the diazo compound, as produced by the diazotization of a primary amine, is generally stabilized by the formation of a complex double salt with particular inorganic salts capable of forming such complex double salts, e.g. diazonium chloride-zinc chloride complexes are stable double salts. In certain cases where the stability of the diazonium compound is somewhat greater than usual, the diazo compounds may be sufficiently stabilized as the diazonium chlorides and sulfates without need of complex formation. Certain organic sulfonic acids, such as naphthalene-1,5-disulfonic acid, are sometimes employed to obtain a stabilized diazonium salt. Many of these salts are obtained in fine crystalline forms which on drying produce powders liable to excessive dust formation. This dusting can in extreme cases constitute a health hazard as well as result in considerable loss of material.

Numerous processes have been adopted to overcome this problem, most successful of which have been the addition of various dust-proofing agents to the powdered material. Compounds that have been proposed as dust-proofing agents include liquid dialkyl carbonates having at least five carbon atoms, alkyl monohaloacetates in which the alkyl groups contain not more than four carbon atoms, stable silicone liquids, liquid aliphatic alcohols containing seven or more carbon atoms. These prior art dust-proofing agents suffer from defects such as caking of the powder, loss of effectiveness on storage or reactivity with the powdered diazo salt.

It is therefore an object of this invention to provide novel non-dusting stabilized diazo salt compositions which are free flowing and do not lose color strength on storage.

Another object is to devise an improved process for the preparation of non-dusting stabilized diazo salt compositions.

These and other objects ancillary thereto will be obvious from the following description of this invention.

It has now been found that by the incorporation of at least 0.25% by weight of a liquid non-ionic long chain fatty acid partial ester of a hexitol anhydride in the dry stabilized diazo salt, non-dusting compositions which are free flowing and which retain their effectiveness or color forming activity are obtained.

The more detailed practice of the invention is illustrated by the following examples, in which parts given are by weight. It is not intended that the scope of the invention should be limited by these specific examples.

*Example 1*

(a) A concentrated diazo press cake (Scarlet RS-salt, the zinc chloride double salt of 6-methoxy-3-nitrobenzene diazonium chloride, 846 parts of approximately 56% strength) was blended with aluminum sulfate (810 parts of each of the two hydrates, the $6H_2O$ and $14H_2O$) to obtain a dry stabilized diazo salt of 20% strength.

(b) To 90 parts of the dried diazo salt obtained above there was added .09 part (1% by weight) of sorbitan monolaurate, oily liquid having a viscosity of 3500 to 5000 centipoises at 25° C. which was thoroughly mixed through the powder. The resulting mixture was a free-flowing non-dusting powder possessing good storage stability and giving clear aqueous solutions which were usable for printing purposes even after 24 hours.

A sample of the same dried diazo salt but containing no sorbitan mono-laurate exhibited considerable dusting when shaken or on being transferred from one container to another and was no more stable to storage. Both fresh and 24 hour prints from solutions of the two samples showed no visible difference due to the presence of the non-ionic surfactant.

*Example 2*

To 90 parts of the dried diazo salt (Scarlet RS-salt) obtained in Example 1(a) above there was added 0.45 part of sorbitan mono-laurate (0.5% by weight), to produce a free flowing powder exhibiting very slight dusting only after prolonged vigorous agitation of the container.

*Example 3*

A sample of dried stabilized diazo salt (Scarlet RS-salt obtained as in Example 1(a) above) was treated with 0.7% by weight of sorbitan mono-laurate. The resultant powder was free flowing, possessed excellent storage stability (showed no change in physical appearance or deterioration in color strength after six months) and was completely non-dusting.

*Example 4*

To 90 parts of dried Scarlet RS-salt (cut to type strength as in Example 1(a) above) there was added with efficient stirring 0.9 part of sorbitan mono-oleate, oily liquid having a viscosity of 900 to 1150 centipoises at 25° C. The resultant mixture was a free flowing, non-dusting powder that readily dissolved in water to give a clear solution and the powder possessed good storage stability especially at temperatures below room temperature.

*Example 5*

The above examples were repeated employing Scarlet 2GS-salt (2,5-dichlorobenzene diazonium chloride-zinc chloride complex salt) as the fast color salt and similar excellent results, as regards non-dusting, storage stability and color strength, were obtained.

*Example 6*

Dry stable diazo salts were prepared substantially as described in Example 1 above, i.e. a wet press cake of the complex double salt was blended with aluminum sulfate. These dry compositions were then admixed with the indicated amount of the non-dusting agent and the resultant product tested for non-dusting character in the following manner:

25 grams of the composition were dropped into a 30" x 1¾ I.D. glass column vertically supported, and equipped with a receiver open to the air. The non-dusting character was rated by visual examination according to the scale Poor—copious cloud of visible dust.
Good—dust cloud evident but rapidly settles.
Excellent—substantially no dust evident.

| Fast Color Salt | Percent Sorbitan Mono-laurate | Non-Dusting Rating |
| --- | --- | --- |
| Blue B | 2 | good. |
| Bordeaux GP | 0.5 | Do. |
| Corinth LP | 1.0 | Do. |
| Orange GR | 1.5 | Do. |
| Red B | 1.0 | Do. |
| Red RC | 0.75 | Do. |
| Red RC | 2.0 | excellent. |

(For identification of the Fast Color Salts see The Chemistry of Synthetic Dyes and Pigments—Lubs, page 208 ff. (published by Reinhold, 1955)).

It will thus be evident that novel non-dusting stabilized diazo compositions have been provided. Many variations in the specific details set out in the above examples can be carried out as will be obvious to those skilled in this art. Thus, for example, other types of stabilized diazo salts can be used, as for example those diazonium compounds stabilized with stannic chloride, naphthalene sulfo acids, fluoroboric acids and the like.

The liquid non-ionic surface active compounds suitable for non-dusting composition are the long chain fatty acid partial esters of hexitol anhydrides such as Lauryl ester of sorbitan
Oleyl ester of mannitan
Mixed esters of sorbitan or mannitan with coconut oil fatty acids, palm oil fatty acids, soya oil fatty acids, etc.

These esters are liquids having a viscosity of from 800 to 5000 cps. (25° C.), and preferably within the range of 3500 to 5000 cps. Such products are available commercially.

Individual members of this class will vary in effectiveness with any specific diazo salt. Similarly the non-dusting character of individual salts may vary with specific members of the class. It will however be within the skill of those experienced in this field to select the most suitable agent after several simple tests readily carried out.

The amount of non-ionic surface active agent employed to produce the non-dusting diazo salt powder may vary over a considerable range. Non-dusting character can be achieved by the use of as small an amount as 0.25% by weight though 1–2% by weight is preferred. Larger quantities, i.e. 3% or more can be used but such larger quantities may cause localized areas of lumping and hence are not generally desirable. The amount of non-ionic liquid utilized, which in general will depend upon the physical character, e.g. fineness of particle, etc., of the diazo salt, and which may vary from batch to batch of any specific diazo salt, should not be so much as to result in liquid separation when the non-dusting composition is allowed to stand. The dust-proofing agent can be incorporated with the dry powdered diazo salt in any manner that will ensure thorough blending.

By the term long chain fatty acid as used in this specification I mean those acids having at least 8 carbon atoms. The maximum chain length is set by the requirement that the ester which is to be formed is a liquid having a specified viscosity.

Although certain preferred embodiments of the invention have been disclosed for purpose of illustration, it will be evident that various changes and modifications may be made therein without departing from the scope and spirit of the invention.

I claim:

1. A composition of matter comprising a pulverulent diazonium salt admixed with at least 0.25% by weight of a liquid non-ionic long chain fatty acid partial ester of a hexitol anhydride.

2. A composition of matter comprising a pulverulent diazonium salt admixed with at least 0.25% by weight of sorbitan mono-laurate.

3. A composition of matter comprising a pulverulent diazonium salt admixed with at least 0.25% by weight of sorbitan mono-oleate.

4. A composition of matter comprising the zinc chloride double salt of 6-methoxy-3-nitrobenzene diazonium chloride admixed with aluminum sulfate and at least 0.25% by weight of a liquid non-ionic long chain fatty acid partial ester of a hexitol anhydride.

5. A composition of matter comprising the zinc chloride double salt of 6-methoxy-3-nitrobenzene diazonium chloride admixed with aluminum sulfate and at least 0.25% by weight of sorbitan mono-laurate.

6. A composition of matter comprising the zinc chloride double salt of 6-methoxy-3-nitrobenzene diazonium chloride admixed with aluminum sulfate and at least 0.25% by weight of sorbitan mono-oleate.

7. A composition of matter comprising 2,5-dichlorobenzene diazonium chloride-zinc chloride complex salt in admixture with aluminum sulfate and at least 0.25% by weight of a liquid non-ionic long chain fatty acid partial ester of hexitol anhydride.

8. A composition of matter comprising 2,5-dichlorobenzene diazonium chloride-zinc chloride complex salt in admixture with aluminum sulfate and at least 0.25% by weight of sorbitan mono-laurate.

9. A composition of matter comprising 2,5-dichlorobenzene diazonium chloride-zinc chloride complex salt in admixture with aluminum sulfate and at least 0.25% by weight of sorbitan mono-oleate.

10. The method of reducing the tendency of pulverulent diazonium salts to form dust clouds which comprises intimately mixing with the diazonium salt a liquid non-ionic long chain fatty acid partial ester of a hexitol anhydride.

11. The method of reducing the tendency of pulverulent diazonium salts to form dust clouds which comprises intimately mixing with the diazonium salt sorbitan monolaurate.

12. The method of reducing the tendency of pulverulent diazonium salts to form dust clouds which comprises intimately mixing with the diazonium salt sorbitan monooleate.

References Cited in the file of this patent

UNITED STATES PATENTS

| 1,607,462 | Keller | Nov. 16, 1926 |
| --- | --- | --- |
| 2,486,562 | Iamarino | Nov. 1, 1949 |

FOREIGN PATENTS

| 527,157 | Canada | July 3, 1956 |
| --- | --- | --- |
| 22,785 | Australia | Oct. 1, 1929 |

OTHER REFERENCES

Atlas Surface Active Agents, Atlas Powder Co. 1948, pp. 39–40, Table I, facing p. 26.
J.S.D.C., September 1946, p. 297.